United States Patent
Lee

(10) Patent No.: US 11,774,840 B2
(45) Date of Patent: Oct. 3, 2023

(54) LIGHT SOURCE MODULE

(71) Applicant: Qisda Corporation, Taoyuan (TW)

(72) Inventor: Peng Lee, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/730,110

(22) Filed: Apr. 26, 2022

(65) Prior Publication Data

US 2023/0244133 A1    Aug. 3, 2023

(30) Foreign Application Priority Data

Jan. 28, 2022 (CN) .......................... 202210104710.3

(51) Int. Cl.
*G03B 21/20* (2006.01)
*G02B 27/28* (2006.01)

(52) U.S. Cl.
CPC ....... *G03B 21/2066* (2013.01); *G02B 27/283* (2013.01); *G03B 21/208* (2013.01); *G03B 21/2073* (2013.01)

(58) Field of Classification Search
None
See application file for complete search history.

(56) References Cited

U.S. PATENT DOCUMENTS

| 2006/0055888 A1* | 3/2006 | Inoko | G03B 21/006 348/E9.027 |
| 2016/0246068 A1* | 8/2016 | Liu | G02B 3/0006 |
| 2017/0123300 A1* | 5/2017 | Shishido | G03B 21/208 |
| 2020/0186760 A1* | 6/2020 | Akiyama | H04N 9/3161 |

* cited by examiner

*Primary Examiner* — Elmito Breval

(57) ABSTRACT

A light source module includes phase retardation layer, first light source, second light source, first Polarization Beam Splitter (PBS) layer, second PBS layer, first redirector and second redirector. The phase retardation layer, the first light source, the second light source, the first PBS layer, the second PBS layer, the first redirector and the second redirector are symmetrically disposed relative to symmetry axis. The first light source and the second light source each emit polarized light having first linear polarization direction and polarized light having second linear polarization direction. The phase retardation layer converts the first linear polarization direction of polarized light into the second linear polarization direction. The PBS layers allow polarized light having the first linear polarization direction to travel through but reflect polarized light having the second linear polarization direction. The redirector reflects polarized light having the second linear polarization direction.

17 Claims, 3 Drawing Sheets

LIGHT SOURCE MODULE

This application claims the benefit of People's Republic of China application Serial No. 202210104710.3, filed on Jan. 28, 2022, the subject matter of which is incorporated herein by reference.

TECHNICAL FIELD

The disclosure relates in general to a light source module.

BACKGROUND

In order to make the projector have high color restoration and vividness, the color light is directly provided from pure laser diode having different wavelengths such as red wavelength, green wavelength or blue wavelength. In order to cooperate with commercial projector with small size and high lumen, a single package including pure three-color laser diode is widely applied to the market. However, if the laser diode is not properly disposed/arranged, it is easy to cause non-uniform color of the emitted light. Therefore, how to enhance the uniformity of the emitted light color is an important issue for those skilled in the art.

SUMMARY

According to an embodiment, a light source module is provided. The light source module includes a first phase retardation layer, a first light source module, a second light source, a first Polarization Beam Splitter (PBS) layer, a second PBS layer, a first refraction layer and a second refraction layer. The first phase retardation layer disposed on a symmetry axis. The first light source module and the second light source are symmetrically disposed relative to the symmetry axis, wherein each of the first light source and the second light source is configured to emit a first polarized light having a first linear polarization direction and a second polarized light having a second linear polarization direction. The PBS layer and the second PBS layer are symmetrically disposed relative to the symmetry axis. The first refraction layer and the second refraction layer are symmetrically disposed relative to the symmetry axis. Wherein the first phase retardation layer is configured to convert the first linear polarization direction of the first polarized light into the second linear polarization direction, the first PBS layer and the second PBS layer allow polarized light having the first linear polarization direction to travel through but reflect polarized light having the second linear polarization direction, the first light redirector layer and the second light redirector layer are configured to reflect polarized light having the second linear polarization direction light, and the first polarized light and the second polarized light respectively have different light colors.

The above and other aspects of the disclosure will become better understood with regard to the following detailed description of the preferred but non-limiting embodimen(s). The following description is made with reference to the accompanying drawings.

Figure 1:
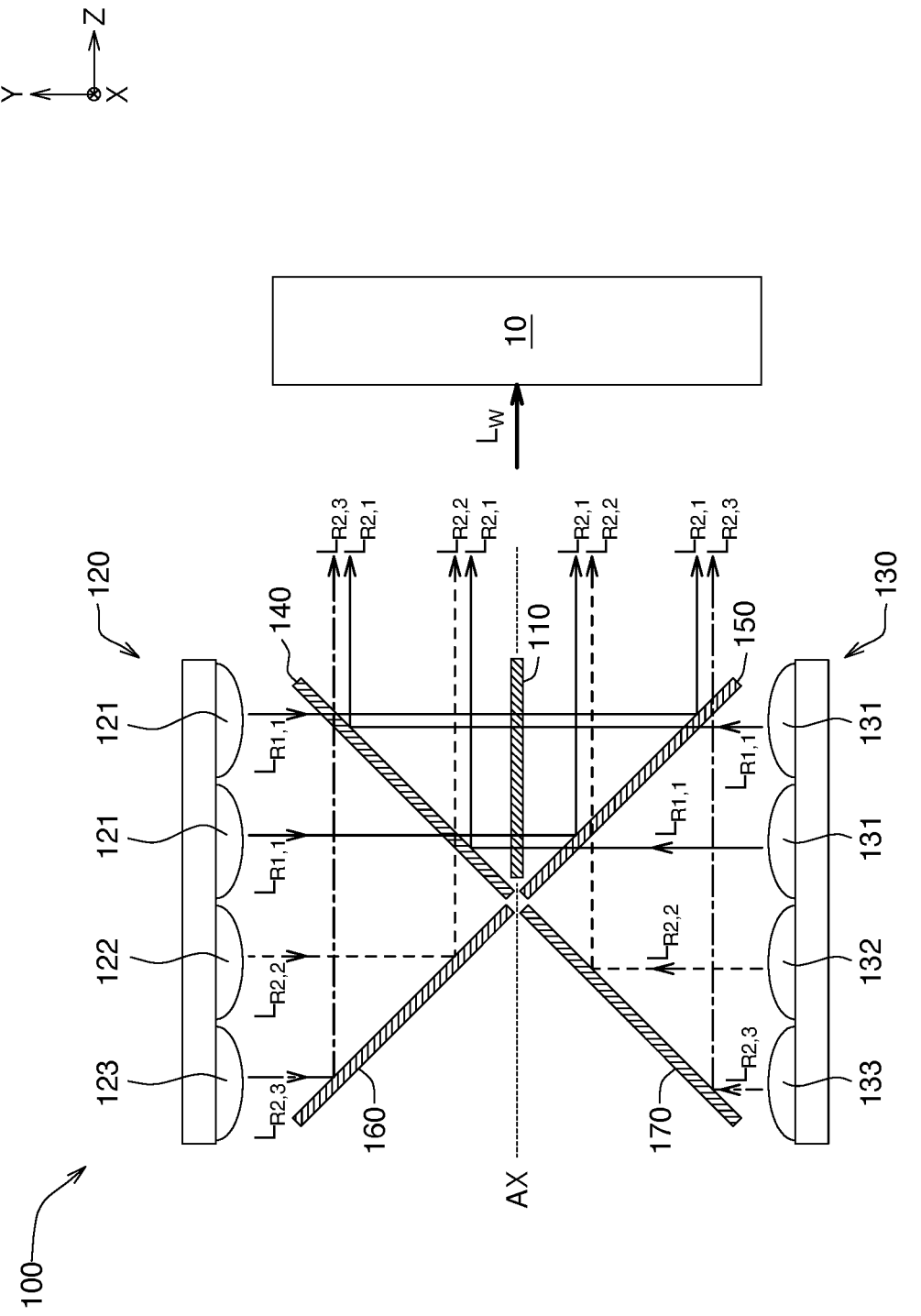
FIG. 1 shows a schematic diagram of a light source module according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, FIG. 1 shows a schematic diagram of a light source module 100 according to an embodiment of the present invention. The light source module 100 could be applied to a device requiring a light source, such as a projector, an illuminator, a display or other types of devices. For projector, the light source module 100 could also be referred to as a light combining module.

The light source module 100 includes a first phase retardation layer 110, at least one first light source 120, at least one second light source 130, a first Polarization Beam Splitter (PBS) 140, and a second PBS layer 150, a first light redirector layer 160 and a second light redirector layer 170.

The first phase retardation layer 110 is disposed on a symmetry axis AX. The first light source 120 and the second light source 130 are symmetrically disposed relative to the symmetry axis AX, and the first light source 120 and the second light source 120 are respectively configured to emit first polarized light $L_{R1,1}$ (subscript "R1" represents a first linear polarization direction) having the first linear polarization direction and a second polarized light $L_{R2,2}$ (subscript "R2" represents a second linear polarization direction) having the second linear polarization direction. The first PBS layer 140 and the second PBS layer 150 are symmetrically disposed relative to the symmetry axis AX. The first light redirector layer 160 and the second light redirector layer 170 are symmetrically disposed relative to the symmetry axis AX. The first phase retardation layer 110 is configured to convert the first linear polarization direction of the first polarized light $L_{R1,1}$ into the second linear polarization direction (the light is represented by $L_{R2,1}$). The first PBS layer 140 and the PBS layer 150 allow the polarized light (for example, the first polarized light $L_{R1,1}$) having the first linear polarization direction to travel through, but reflect the polarized light (for example, the first polarized light $L_{R2,1}$) having the second linear polarization direction. The first light redirector layer 160 and the second light redirector layer 170 are configured to reflect the polarized light having the second linear polarization direction. The first polarized light $L_{R1,1}$ and the second polarized light $L_{R2,2}$ have different light colors, respectively.

Compared with the asymmetric configuration, due to the entirety of the first light source 120, the first light redirector layer 160 and the first PBS layer 140 and the entirety of and the second light source 130, the second light redirector layer 170 and the second PBS layer 150 being symmetrical relative to the symmetry axis AX, the mixed light of the first polarized light $L_{R1,1}$ emitted by the first light source 120 and the second polarized light $L_{R2,2}$ emitted by the second light source 130, after traveling through the PBS layer, have better color uniformity.

The first linear polarization direction is, for example, one of P polarization direction and S polarization direction, and the second linear polarization direction is, for example, the other one of the P polarization direction and the S polarization direction. The first linear polarization direction in the embodiment of the present disclosure is, for example, the P polarization direction and the second linear polarization direction is, for example, the S polarization direction. In addition, the first polarized light $L_{R1,1}$ (the subscript "1" represents the first wavelength) has the first wavelength, and the second polarized light $L_{R2,2}$ (the subscript "2" represents the second wavelength) has the second wavelength. The first wavelength is, for example, one of red light, blue light and green light, and the second wavelength is, for example, another of red light, blue light and green light, wherein the wavelength of red light ranges, for example, between about 620 nanometers (nm) and about 750 nm, the wavelength of blue light ranges, for example, between about 450 nm and about 495 nm, and the wavelength of green light ranges, for example, between about 495 nm and about 570 nm. The first wavelength in the embodiment of the present disclosure is, for example, red light wavelength, and the second wavelength is, for example, the blue light.

The first phase retardation layer 110 is, for example, a half wave plate (HWP). As shown in FIG. 1, an extending direction of the first phase retardation layer 110 is substantially parallel to or coincident with the symmetry axis AX.

As shown in FIG. 1, the optical path of the first polarized light $L_{R1,1}$ emitted by the first light source 120 travels through the first PBS layer 140, the first phase retardation layer 110 and the second PBS layer 150 in sequence, and is reflected from the second PBS layer 150 to a module 10. The module 10 is, for example, an illumination module or an imaging module. The optical path of the first polarized light $L_{R1,1}$ emitted by the second light source 130 travels through the second PBS layer 150, the first phase retardation layer 110 and the first PBS layer 140 in sequence and, is reflected from the first PBS layer 140 to the module 10.

As shown in FIG. 1, the optical path of the second polarized light $L_{R2,2}$ emitted by the first light source 120 travels through the first light redirector layer 160 and the first PBS layer 140 in sequence and is incident on the module 10 after traveling through the first PBS layer 140. The optical path of the second polarized light $L_{R2,2}$ emitted by the second light source 130 travels through the second light redirector layer 170 and is incident on the module 10 after traveling through the second PBS layer 150.

As shown in FIG. 1, the first light source 120 includes at least one first light-emitting element 121 and at least one second light-emitting element 122. The first light-emitting element 121 is configured to emit first polarized light $L_{R1,1}$ having the first linear polarization direction. The second light-emitting element 122 is configured to emit the second polarized light $L_{R2,2}$ having the second linear polarization direction. The first light-emitting element 121 of the first light source 120 is disposed opposite to the first PBS layer 140, so the first polarized light $L_{R1,1}$ emitted by the first light source 120 could be incident on the first PBS layer 140. The second light-emitting element 122 of the first light source 120 is disposed opposite to the first light redirector layer 160, so the second polarized light $L_{R2,2}$ emitted by the first light source 120 could be incident on the first light redirector layer 160.

As shown in FIG. 1, the second light source 130 includes at least one first light-emitting element 131 and at least one second light-emitting element 132. The first light-emitting element 131 is configured to emit first polarized light $L_{R1,1}$ having the first linear polarization direction. The second light-emitting element 132 is configured to emit the second polarized light $L_{R2,2}$ having the second linear polarization direction. The first light-emitting element 131 of the second light source 130 is disposed opposite to the second PBS layer 150, so that the first polarized light $L_{R1,1}$ emitted by the first light source 120 could be incident on the second PBS layer 150. The second light-emitting element 132 of the second light source 130 is disposed opposite to the second light redirector layer 170, so that the second polarized light $L_{R2,2}$ emitted by the second light source 130 could be incident on the second light redirector layer 170.

As shown in FIG. 1, the first light source 120 further includes at least one third light-emitting element 123. The third light-emitting element 123 is configured to emit the third polarized light $L_{R2,3}$ having the second linear polarization direction. The third light-emitting element 123 of the first light source 120 is disposed opposite to the first light redirector layer 160, so that the third polarized light $L_{R2,3}$ emitted by the first light source 120 could be incident on the first light redirector layer 160. The second light source 130 further includes at least one third light-emitting element 133 configured to emit the third polarized light $L_{R2,3}$ having the second linear polarization direction. The third light-emitting element 133 of the second light source 130 is disposed opposite to the second light redirector layer 170, so that the third polarized light $L_{R2,3}$ emitted by the second light source 130 could be incident on the second light redirector layer 170. In the present embodiment, the third polarized light $L_{R2,3}$ (the subscript "3" represents the third wavelength) has the third wavelength, and the third wavelength is different from the first wavelength and the second wavelength. The third wavelength is, for example, one of red light wavelength, blue light wavelength and green light wavelength, for example, the green light wavelength.

As shown in FIG. 1, the optical path of the third polarized light $L_{R2,3}$ emitted by the first light source 120 travels through the first light redirector layer 160 and the first PBS layer 140 in sequence and be incident on the module 10 after traveling through the PBS layer 140. The optical path of the third polarized light $L_{R2,3}$ emitted by the second light source 130 travels through the second light redirector layer 170 and the second PBS layer 150 in sequence and be incident on the module 10 after traveling through the second PBS layer 150.

As shown in FIG. 1, for the first light source 120, the first light-emitting element 121, the second light-emitting element 122 and the third light-emitting element 123 are arranged in the Z-axis. In addition, a number of the first light-emitting elements 121 are arranged in two rows along the X-axis, a number of the second light-emitting elements 122 are arranged in one row along the X-axis, and a number of the third light-emitting elements 123 are arranged in a row along the X-axis. However, the embodiment of the present invention does not limit the number of rows of the first light-emitting element 121, the second light-emitting element 122 and the third light-emitting element 123, and also does not limit the arrangement order of the first light-emitting element 121, the second light-emitting element 122 and the third light-emitting element 121 in the Z-axis. The light-emitting element of the second light source 130 has the features the same as or similar to that the light-emitting element of the first light source 120, and similarities are not repeated here.

As shown in FIG. 1, the first PBS layer 140 and the second PBS layer 150, for example, only work on the light having the first wavelength (for example, for the light having the first wavelength, such PBS layers allow the polarization light having the first linear polarization direction to travel through but reflect the polarization light having the second polarization direction), but allows the light having the other wavelength (for example, the second wavelength and the third wavelength) to travel through (regardless of the polarization state, such PBS layers allow the light having the other wavelength to travel through). In other words, in the present embodiment, the first PBS layer 140 and the second PBS layer 150 allow the polarized light having the first wavelength and the first linear polarization direction to travel through but reflect the polarized light having the first wavelength and the second linear polarization direction.

In the present embodiment, the first light redirector layer 160 and the second light redirector layer 170 are, for example, reflective mirrors (reflective layers) which could reflect the light having the first polarization direction or the second polarization direction and any wavelength (for example, the first wavelength, the second wavelength and the third wavelength).

Figure 2:
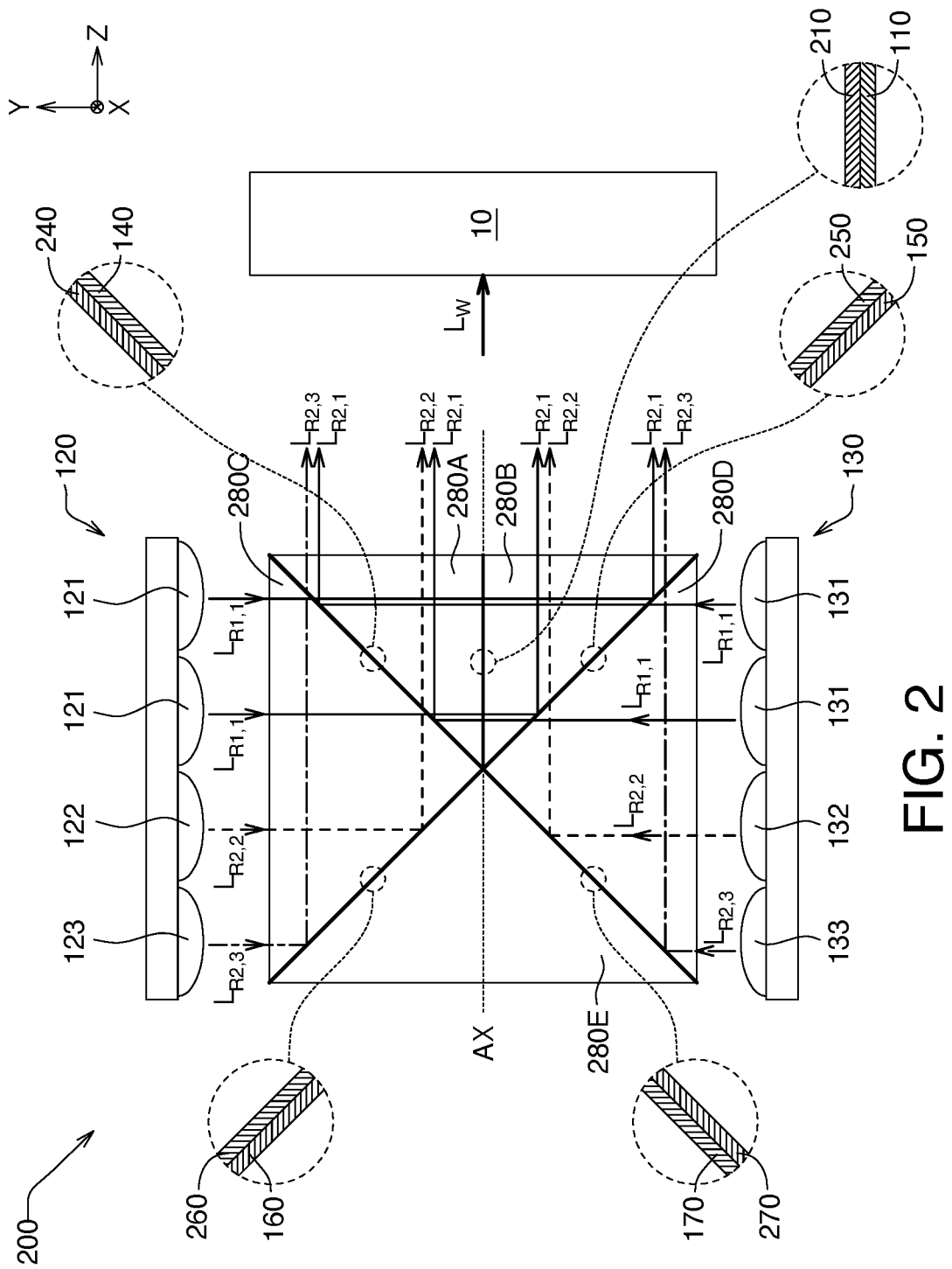
FIG. 2 shows a schematic diagram of a light source module according to another embodiment of the present invention.

Referring to FIG. 2, FIG. 2 shows a schematic diagram of a light source module 200 according to another embodiment of the present invention. The light source module 200 could be applied to a device requiring a light source, such as a projector, an illuminator, a display or other types of devices. For projector, the light source module 200 could also be referred to as a light combining module.

The light source module 200 includes the first phase retardation layer 110, at least one first light source 120, at least one second light source 130, the first PBS 140, the second PBS layer 150, the first refraction layer 160, the second refraction layer 170, a first prism 280A, a second prism 280B, a third prism 280C, a fourth prism 280D, a fifth prism 280E, a first light-transmissive layer 210, a second light-transmissive layer 240, a third light-transmissive layer 250, a fourth light-transmissive layer 260 and a fifth light-transmissive layer 270.

The light source module 200 includes the technical features the same as or similar to that of the light source module 100 expect that the light source module 200 further includes a plurality of prisms 280A to 280E. In the present embodiment, the first prism 280A, the second prism 280B, the third prism 280C, the fourth prism 280D and the fifth prism 280E form a light-combining element or connected to form the light-combining element.

As shown in FIG. 2, the first prism 280A and the second prism 280B are symmetrically disposed relative to the symmetry axis AX. The third prism 280C and the fourth prism 280D are symmetrically disposed relative to the axis of symmetry AX. The fifth prism 280E is symmetrically disposed relative to the symmetry axis AX, for example, the symmetry axis AX passes through a center of the fifth prism 280E.

As shown in FIG. 2, the first phase retardation layer 110 is formed between the first prism 280A and the second prism 280B. The first PBS layer 140 is formed between the first prism 280A and the third prism 280C. The second PBS layer 150 is formed between the second prism 280B and the fourth prism 280D. The first light redirector layer 160 is disposed between the fifth prism 280E and the third prism 280C. The second light redirector layer 170 is disposed between the fifth prism 280E and the fourth prism 280D.

As shown in FIG. 2, the first light-transmissive layer 210 is formed between the first prism 280A and the second prism 280B. The second light-transmissive layer 240 is formed between the first prism 280A and the third prism 280C. The third light-transmitting layer 250 is formed between the second prism 280B and the fourth prism 280D. The fourth light-transmitting layer 260 is formed between the first prism 280A and the fifth prism 280E. The fifth light-transmitting layer 270 is formed between the fourth prism 280D and the fifth prism 280E. The light-transmitting layer, for example, has a transmittance of at least 98%, which could reduce light loss. In another embodiment, the light source module 200 could omit at least one of the first light-transmissive layer 210, the second light-transmissive layer 240, the third light-transmissive layer 250, the fourth light-transmissive layer 260 and the fifth light-transmissive layer 270.

In terms of manufacturing process, in an embodiment, the first phase retardation layer 110 could be pre-formed on one of the first prism 280A and the second prism 280B, and the first light-transmitting layer 210 could be pre-formed on the other of the first prism 280A and the second prism 280B. The first PBS layer 140 could be pre-formed on one of the first prism 280A and third prism 280C, and the second light-transmitting layer 240 could be pre-formed on the other of the first prism 280A and third prism 280C. The second PBS layer 150 could be pre-formed on one of the second prism 280B and the fourth prism 280D, and the third light-transmitting layer 250 could be pre-formed on the other of the second prism 280B and the fourth prism 280D. The first light redirector layer 160 could be pre-formed on one of the third prism 280C and the fifth prism 280E, and the fourth light-transmissive layer 260 could be pre-formed on the other of the third prism 280C and the fifth prism 280E. The second light redirector layer 170 could be pre-formed on one of the fourth prism 280D and the fifth prism 280E, and the fifth light-transmissive layer 270 could be pre-formed on the other of the fourth prism 280D and the fifth prism 280E. The aforementioned "pre-forming" is achieved by using techniques, for example, coating, adhering, spraying, etc.

Figure 3:
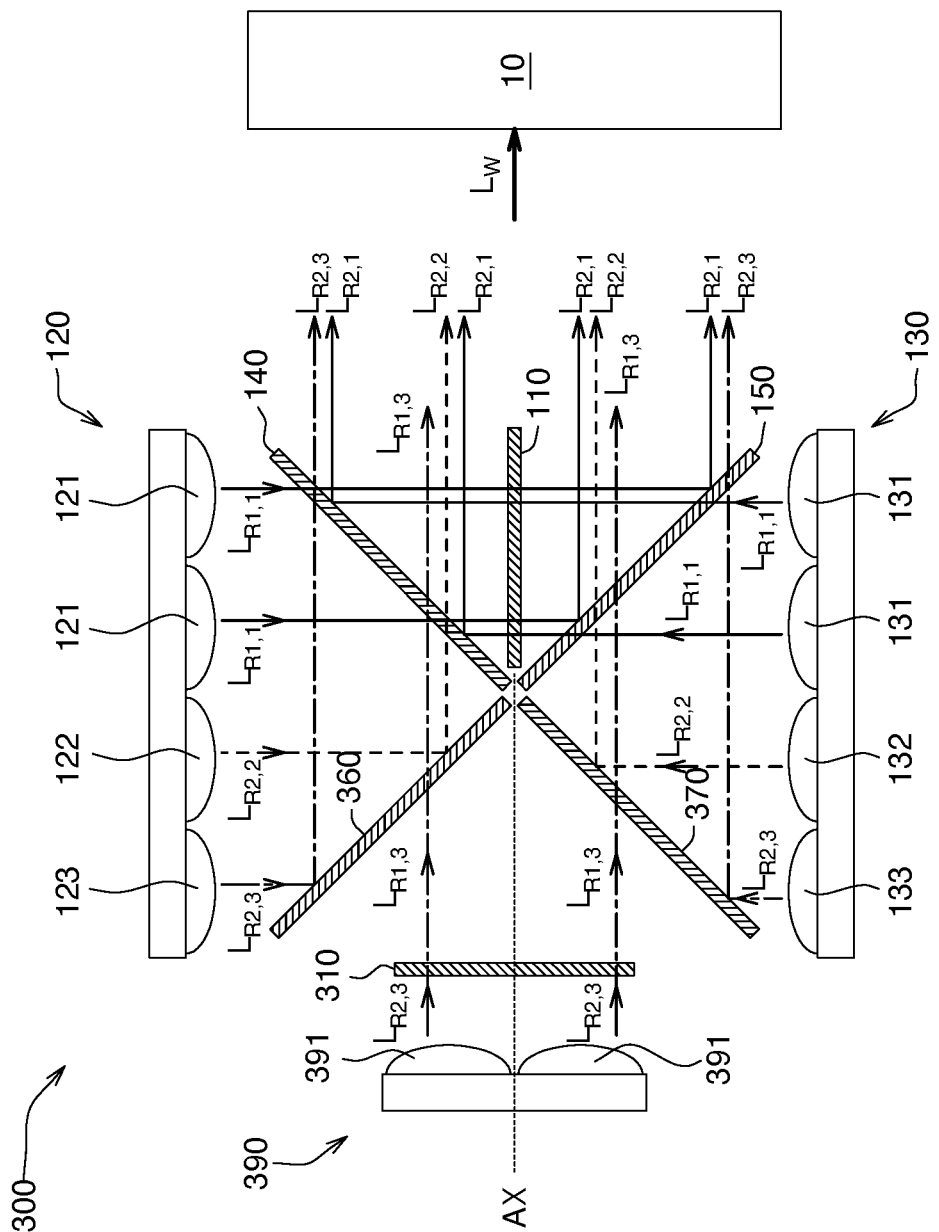
FIG. 3 shows a schematic diagram of a light source module according to another embodiment of the present invention.

Referring to FIG. 3, FIG. 3 shows a schematic diagram of a light source module 300 according to another embodiment of the present invention. The light source module 300 could be applied to a device requiring a light source, such as a projector, an illuminator, a display or other types of devices. For projector, the light source module 300 could also be referred to as a light combining module.

The light source module 300 includes the first phase retardation layer 110, at least one first light source 120, at least one second light source 130, the first PBS layer 140, the second PBS layer 150, a first light redirector layer 360, a second light redirector layer 370, at least one third light source 390 and a second phase retardation layer 310. The light source module 300 includes the technical features the same as or similar to that of the light source module 100 expect that the light source module 300 further includes the third light source 390 and the second phase retardation layer 310.

The third light source 390 is configured to emit third polarized light $L_{R2,3}$ having the second linear polarization direction. The third light source 390 includes at least one fourth light-emitting element 391 configured to emit the third polarized light $L_{R2,3}$. In another embodiment, the fourth light-emitting element 391 could emit the second polarized light $L_{R2,2}$. The second phase retardation layer 310 is disposed opposite to the third light source 390, so that the third polarized light $L_{R2,3}$ emitted by the third light source 390 could be incident on the second phase retardation layer 310. The second phase retardation layer 310 is configured to convert the second linear polarization direction of the third polarized light $L_{R2,3}$ into the first linear polarization direction (the light is represented by $L_{R1,3}$). An extending direction of the second phase retardation layer 310 is substantially perpendicular to the symmetry axis AX. The third light source 390 and the second phase retardation layer 310 are symmetrical relative to the symmetry axis AX, for example, the symmetry axis AX passes through a center of the third light source 390 and a center of the second phase retardation layer 310. The second phase retardation layer 310 is disposed opposite to the first refraction layer 360 and the second refraction layer 370, so that the light traveling through the second phase retardation layer 310 could be incident on the first refraction layer 360 and the second refraction layer 370.

As shown in FIG. 3, the first light redirector layer 360 and the second light redirector layer 370 are, for example, PBS layers. For example, the first refraction layer 360 and the second refraction layer 370, for example, only work on the light having the second wavelength and the third wavelength (for example, for the light having the second wavelength and the third wavelength, such PBS layers allow the polarization light having the first polarization direction (for example, the polarized light $L_{R1,3}$) to travel through but reflects the polarized light having the second polarization direction (for example, the polarized light $L_{R2,3}$, $L_{R2,2}$), but allows the light having other wavelength (for example, the first wavelength) to travel through (regardless of the polarization state, such PBS layers allow the light having the other wavelength to travel through).

As shown in FIG. 3, due to the first PBS layer 140 and the second PBS layer 150 only working on the light having the first wavelength, for the polarized light $L_{R1,3}$ and $L_{R2,3}$ having the third wavelength and the polarized light $L_{R2,2}$ having the second wavelength, regardless of the polarization state, such the polarized lights could be incident on the module 10 after traveling through the first PBS layer 140 and the second PBS layer 150.

In the present embodiment, the third polarized light $L_{R2,3}$ emitted by the third light source 390 is green light. Compared with the light source modules 100 and 200, the light source module 300 provides more green light. Green light accounts for about 70% of white light. The more the proportion of green light is, the higher the brightness of white light is. Since the third light source 390 of the light source module 300 provides more green light, the brightness of the white light emitted by the light source module 300 could be improved.

To sum up, the light source module of the embodiment of the present invention includes a symmetry axis, two optical component sets and a phase retardation layer, wherein each optical component set includes at least one light source, at least one PBS layer and at least one light redirector layer. The two optical component sets are symmetrically arranged relative to the symmetry axis. The phase retardation layer is also symmetrically arranged relative to the symmetry axis, for example, the extending direction of the phase retardation layer is substantially parallel or perpendicular to the symmetry axis, or the symmetry axis passes through the entire of the phase retardation layer in the length of the phase retardation layer. By the symmetrical arrangement of the two optical component sets, the uniform distribution of energy could be achieved, thereby improving the color uniformity of the light (mixed light) provided by the light source module.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A light source module, comprising:
a first phase retardation layer disposed on a symmetry axis;
a first light source module and a second light source symmetrically disposed relative to the symmetry axis, wherein each of the first light source and the second light source is configured to emit a first polarized light having a first linear polarization direction and a second polarized light having a second linear polarization direction;
a first Polarization Beam Splitter (PBS) layer and a second PBS layer symmetrically disposed relative to the symmetry axis;
a first refraction layer and a second refraction layer symmetrically disposed relative to the symmetry axis;
wherein the first phase retardation layer is configured to convert the first linear polarization direction of the first polarized light into the second linear polarization direction, the first PBS layer and the second PBS layer allow polarized light having the first linear polarization direction to travel through but reflect polarized light having the second linear polarization direction, the first light redirector layer and the second light redirector layer are configured to reflect polarized light having the second linear polarization direction light, and the first polarized light and the second polarized light respectively have different light colors.

2. The light source module according to claim 1, wherein an optical path of the first polarized light emitted by the first light source travels through the first PBS layer, the first phase retardation layer and the second PBS layer, and an optical path of the first polarized light emitted by the second light source travels through the second PBS layer, the first phase retardation layer and the first PBS layer in sequence.

3. The light source module according to claim 1, wherein an optical path of the second polarized light emitted by the first light source travels through the first light redirector layer and the first PBS layer in sequence, and an optical path of the second polarized light emitted by the second light source travels through the second light redirector layer and the second PBS layer in sequence.

4. The light source module according to claim 1, wherein each of the first light source and the second light source is configured to emit a third polarized light having the second linear polarization direction, an optical path of the third polarized light emitted by the first light source travels through the first light redirector layer and the first PBS layer in sequence, and an optical path of the third polarized light emitted by the second light source travels through the second light redirector layer and the second PBS layer in sequence.

5. The light source module according to claim 1, wherein each of the first light source and the second light source comprises a first light-emitting element and a second light-emitting element, the first light-emitting element is configured to emit the first polarized light having the first linear polarization direction, the second light-emitting element is configured to emit the second polarized light having the second linear polarization direction, the first light-emitting element of the first light source is disposed opposite to the first PBS layer, the second light-emitting element of the first light source is disposed opposite to the first light redirector layer, the first light-emitting element of the second light source is disposed opposite to the second PBS layer, and the second light-emitting element of the second light source is disposed opposite to the second light redirector layer.

6. The light source module according to claim 5, wherein each of the first light source and the second light source comprises a third light-emitting element configured to emit a third polarized light having the second linear polarization direction, the third light-emitting element of the first light source is disposed relative to the first refraction layer, and the third light-emitting element of the second light source is disposed relative to the second refraction layer.

7. The light source module according to claim 1, further comprising:
a first prism and a second prism symmetrically disposed relative to the symmetry axis;
wherein the first phase retardation layer is formed between the first prism and the second prism.

8. The light source module according to claim 7, further comprising:
a third prism and a fourth prism symmetrically disposed relative to the symmetry axis;
wherein the first PBS layer is formed between the first prism and the third prism, and the second PBS layer is formed between the second prism and the fourth prism.

9. The light source module according to claim 1, further comprising:
a prism disposed opposite to the symmetry axis;
wherein the first refraction layer and the second refraction layer are disposed on the prism.

10. The light source module according to claim 8, further comprising:
a fifth prism being symmetrical relative to the symmetry axis;
wherein the first light redirector layer is disposed between the fifth prism and the third prism, and the second light redirector layer is disposed between the fifth prism and the fourth prism.

11. The light source module according to claim 1, wherein the first polarized light has a first wavelength, the second polarized light has a second wavelength, the first PBS layer and the second PBS layer allow polarized light having the first wavelength and the first linear polarization direction to travel through but reflect polarized light having the first wavelength and the second linear polarization direction.

12. The light source module according to claim 1, wherein the first light redirector layer and the second light redirector layer are reflective layers.

13. The light source module according to claim 1, wherein the first light redirector layer and the second light redirector layer are PBS layers.

14. The light source module according to claim 13, further comprises:
a third light source configured to emit a third polarized light having the second linear polarization direction; and
a second phase retardation layer disposed opposite to the third light source and configured to convert the second linear polarization direction of the third polarized light into the first linear polarization direction.

15. The light source module of claim 14, wherein the third polarized light has a second wavelength, the first light redirector layer and the second light redirector layer are configured to allow polarized light having the second wavelength and the first linear polarization direction to travel through but reflect polarized light having the second wavelength and the second linear polarization direction.

16. The light source module of claim 14, wherein the third light source and the second phase retardation layer are symmetrical relative to the symmetry axis.

17. The light source module of claim 14, wherein the second phase retardation layer is disposed opposite to the first light redirector layer and the second light redirector layer.

* * * * *